(12) United States Patent
Mori

(10) Patent No.: US 10,747,715 B2
(45) Date of Patent: Aug. 18, 2020

(54) APPARATUS THAT PROVIDES GENERATION SERVICE OF DOCUMENT FILE INCLOUD SYSTEM, METHOD, AND STORAGE MEDIUM

(71) Applicant: CANON KABUSHIKI KAISHA, Tokyo (JP)

(72) Inventor: Namihiro Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 506 days.

(21) Appl. No.: 15/707,107

(22) Filed: Sep. 18, 2017

(65) Prior Publication Data
US 2018/0089202 A1  Mar. 29, 2018

(30) Foreign Application Priority Data

Sep. 27, 2016  (JP) ................................. 2016-188119

(51) Int. Cl.
*G06F 16/30* (2019.01)
*G06F 16/11* (2019.01)
*G06F 16/93* (2019.01)
*G06F 16/188* (2019.01)

(52) U.S. Cl.
CPC .......... *G06F 16/116* (2019.01); *G06F 16/119* (2019.01); *G06F 16/188* (2019.01); *G06F 16/94* (2019.01)

(58) Field of Classification Search
CPC .............................. G06F 16/116; G06F 16/119
See application file for complete search history.

(56) References Cited

U.S. PATENT DOCUMENTS

| 9,619,306 B2 | 4/2017 | Mori | |
| 10,019,415 B1* | 7/2018 | Wombell | G06F 40/14 |
| 2005/0125724 A1* | 6/2005 | Peiro | G06F 40/14 |
| | | | 715/239 |
| 2008/0082907 A1* | 4/2008 | Sorotokin | G06F 40/106 |
| | | | 715/210 |
| 2011/0129159 A1* | 6/2011 | Cifarelli | G06K 9/6226 |
| | | | 382/224 |
| 2011/0258535 A1* | 10/2011 | Adler, III | G06F 40/109 |
| | | | 715/235 |

(Continued)

FOREIGN PATENT DOCUMENTS

JP         2015005150 A      1/2015

*Primary Examiner* — Mahesh H Dwivedi
(74) *Attorney, Agent, or Firm* — Venable LLP

(57) ABSTRACT

In the case where services of generation and saving of a document file are provided on a cloud system, suppression of the number of document files to be generated and maintenance of display performance are caused to coexist. A server apparatus that provides a generation service of a document file, the apparatus including: a communication unit configured to receive source data, which is a source of a document file, from a client apparatus; a file generation unit configured to generate a document file based on a plurality of resources included in the source data; and a saving unit configured to save a generated document file in a storage, and the file generation unit determines which of an in-line method and an external reference method is applied to each of a plurality of resources included in the source data in accordance with a situation of access to the storage and generate the document file based on results of the determination.

18 Claims, 13 Drawing Sheets

(56) References Cited

U.S. PATENT DOCUMENTS

| | | | |
|---|---|---|---|
| 2015/0036940 A1* | 2/2015 | Saunders | G06Q 10/10 |
| | | | 382/218 |
| 2015/0082148 A1* | 3/2015 | Lai | G06F 40/109 |
| | | | 715/235 |
| 2016/0094681 A1* | 3/2016 | Wu | G06F 16/211 |
| | | | 709/203 |
| 2017/0199850 A1* | 7/2017 | Mishra | G06F 40/14 |
| 2018/0101525 A1* | 4/2018 | Hirata | G06F 16/93 |

* cited by examiner

| Job ID (601) | File name (602) | URL (603) | Already-accessed flag (604) |
|---|---|---|---|
| 1 | 1.html | http://aaa.co.jp/job1/1.html | TRUE |
| 1 | 1.svg | http://aaa.co.jp/job1/1.svg | TRUE |
| 1 | 1.css | http://aaa.co.jp/job1/styles/1.css | TRUE |
| 1 | 1.ttf | http://aaa.co.jp/job1/fonts/1.ttf | TRUE |
| 1 | 1.jpg | http://aaa.co.jp/job1/images/1.jpg | TRUE |
| 1 | 1.png | http://aaa.co.jp/job1/images/1.png | TRUE |
| 1 | 2.svg | http://aaa.co.jp/job1/2.svg | TRUE |
| 1 | 2.css | http://aaa.co.jp/job1/styles/2.css | TRUE |
| 1 | 2.ttf | http://aaa.co.jp/job1/fonts/2.ttf | TRUE |
| 2 | 1.html | http://aaa.co.jp/job2/1.html | FALSE |
| 2 | 1.svg | http://aaa.co.jp/job2/1.svg | FALSE |
| 2 | 2.svg | http://aaa.co.jp/job2/2.svg | FALSE |
| ⋮ | ⋮ | ⋮ | ⋮ |

FIG.6

SITUATION OF ACCESS: Low
THRESHOLD VALUE: 30KB

SITUATION OF ACCESS: Medium
THRESHOLD VALUE: 250KB

SITUATION OF ACCESS: High
THRESHOLD VALUE: 600KB

APPARATUS THAT PROVIDES GENERATION SERVICE OF DOCUMENT FILE INCLOUD SYSTEM, METHOD, AND STORAGE MEDIUM

BACKGROUND OF THE INVENTION

Field of the Invention

The present invention relates to a technique to generate a document file on a cloud system.

Description of the Related Art

In recent years, as an aspect in which management of business data and various kinds of processing are performed on a server computer side, a cloud computing system (hereinafter, "cloud system") has begun to prevail. It is possible for a user to access a Web page of a cloud server from a Web browser of a client apparatus via the Internet and to generate, browse, and edit business data on the Web page. Specifically, in the case where a user uploads business data via the Web page, a document file in a predetermined format is generated and displayed on the Web page by the cloud service. Further, the generated document file is saved in a storage and it is possible for a user to download the saved document file, display the document file on the Web browser, and edit the document.

As an example of the predetermined format of a document file generated by the cloud service, mention is made of SVG (Scalable Vector Graphics). The SVG is a format in which an image is drawn in a vector format based on XML (Extensible Markup Language) and it is said that affinity with the display on a Web browser is high. Further, the SVG has characteristics that it is possible to make up various resources also as separate files, different from PDF (Portable Document Format) that is a format in the same vector format. Because of this, there are characteristics that the number of files differs depending on the configuration of the SVG even though the drawing contents are the same. Specifically, in the case where a plurality of resources is described by an in-line method (internal reference method), the number of files is small and in the case where a plurality of resources is described by an external reference method, the number of files is large.

As described above, a document file generated by the cloud service is saved in the storage as a component of the cloud server and the client apparatus accesses the storage and acquires the document file at the time of displaying the document file on the Web browser. The storage receives access from a plurality of client terminals on the cloud system, and therefore, the storage is designed so as to limit access in the case where a predetermined amount or more of load is imposed. In the case where the number of accesses to the files saved in the storage per unit time exceeds a predetermined number and access is limited, a user is obliged to wait until the processing to read or write a file being processed currently is completed. Regarding this point, in order to prevent access from being limited as much as possible even in the case where access concentrates, it is sufficient to apply the in-line method at the time of generating a document file in the SVG format. However, in the case of the in-line method, there is a disadvantage in that the load of the processing at the time of displaying a page of a generated document file on a client apparatus becomes heavy because the data size per file becomes large as the number of files becomes small. Consequently, in the case where a document file is generated and saved on the cloud system, it is necessary to make an attempt to cause both the items to coexist, i.e., suppression of the number of files and maintenance of display processing performance, which are in a trade-off relationship.

As a method of changing the configuration of a document file that is handled on the cloud system based on conditions, for example, there is a method of Japanese Patent Laid-Open No. 2015-005150. In this method, at the time of generating a document file in the PDF format, whether or not embedment of a font is specified, which is one kind of resource in drawing data, is determined and in the case where embedment is specified, the font is embedded in the document file. However, the method of Japanese Patent Laid-Open No. 2015-005150 is not useful to solve the problem of coexistence of suppression of the number of files and display processing performance in the case where the number of files of a document file to be generated does not change and a document file having a structure, such as the SVG, is generated.

SUMMARY OF THE INVENTION

The server apparatus according to the present invention is a server apparatus that provides a generation service of a document file, the apparatus including: a communication unit configured to receive source data, which is a source of a document file, from a client apparatus; a file generation unit configured to generate a document file based on a plurality of resources included in the source data; and a saving unit configured to save a generated document file in a storage, and the file generation unit determines which of an in-line method and an external reference method is applied to each of a plurality of resources included in the source data in accordance with a situation of access to the storage and generates the document file based on results of the determination.

Further features of the present invention will become apparent from the following description of exemplary embodiments with reference to the attached drawings.

BRIEF DESCRIPTION OF THE DRAWINGS

FIG. 5A shows an external reference method and FIG. 5B shows an in-line method;

FIG. 6 is a diagram showing an example of a data structure in the case where a data storage stores an SVG document;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<System Configuration>

Figure 1:
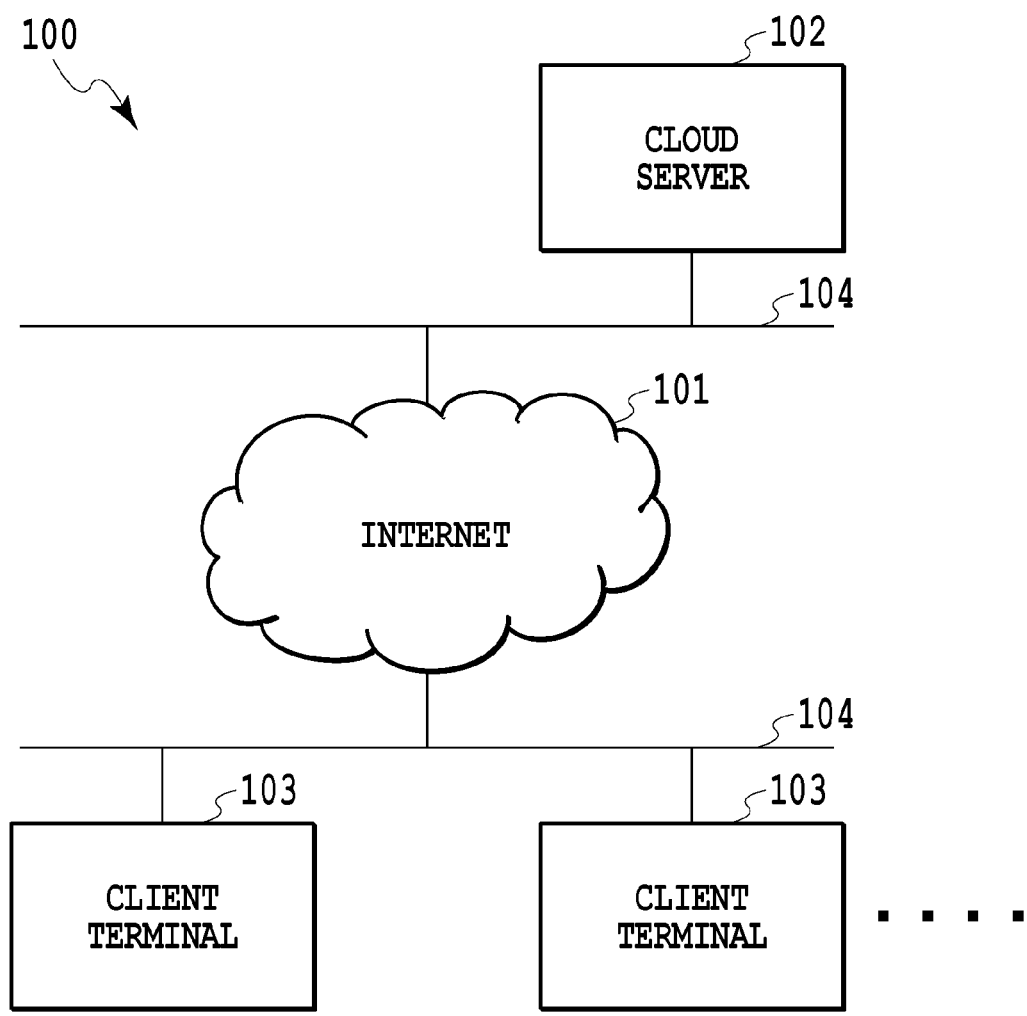
FIG. 1 is a diagram showing a configuration example of a cloud system.

In the present embodiment, explanation is given by premising a scene in which a cloud server provides a cloud service to generate and save a document file in the SVG format in accordance with a request from a client apparatus. FIG. 1 is a diagram showing a configuration example of a cloud computing system (cloud system). A cloud system 100 includes a server apparatus (cloud server) 102 that provides a cloud service and a plurality of client apparatuses 103 and these are connected to one another via a LAN 104 and Internet 101. The Internet 101 is a communication line to transmit and receive data that is a source (hereinafter, called "source data") at the time of generating a document file in the SVG format and user instructions between the cloud server 102 and the client apparatus 103 without being blocked by a firewall. The client apparatus 103 refers to a terminal, such as a personal computer, a tablet, and a smartphone, allocated to each user. The LAN 104 and the Internet 101 are communication line networks that support, for example, the TCP/IP protocol, and may be wired or wireless. The cloud server 102 may be one computer or may be made up of a plurality of computers each having each function and role. For example, it may also be possible to make up the cloud server 102 by a plurality of computers, such as a Web server in charge of Web services, an application server in charge of a generation service of a document file, and a storage server in charge of data saving. Further, in the case where the cloud server 102 is implemented by a plurality of computers, part of the plurality of computers may be made up as a virtual PC.

Figure 2:
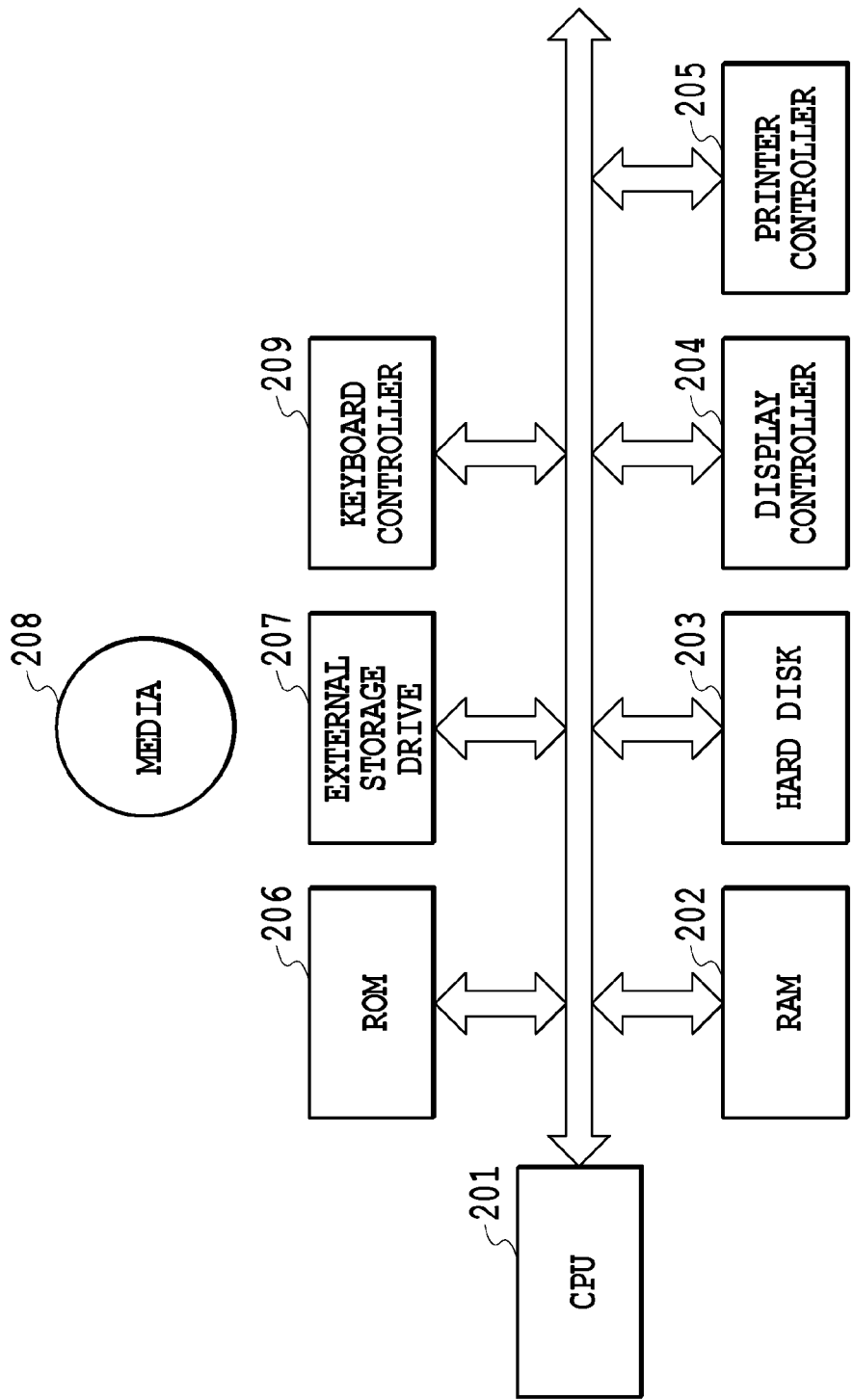
FIG. 2 is a block diagram showing an example of a hardware configuration of a cloud server and a client apparatus.

FIG. 2 is a block diagram showing an example of a hardware configuration of the cloud server 102 and the client apparatus 103. A CPU 201 executes programs stored in a program area inside a ROM 206 and programs, such as an OS and general-purpose applications, loaded from a hard disk 203 onto a RAM 202. The RAM 202 functions as a main memory, a work area, and so on of the CPU 201. The hard disk 203 stores a boot program, various applications, font data, user files, electronic document files, and so on. A program that implements the generation and saving service of a document file in the SVG format (hereinafter, simply called "SVG document") in the present embodiment is stored in the hard disk 203 of the cloud server 102 and is read onto the RAM 202 and executed by the CPU 201. A display controller 204 performs display control of a display, not shown schematically. A network controller 205 performs control of communication with another device connected to the network.

Figure 3:
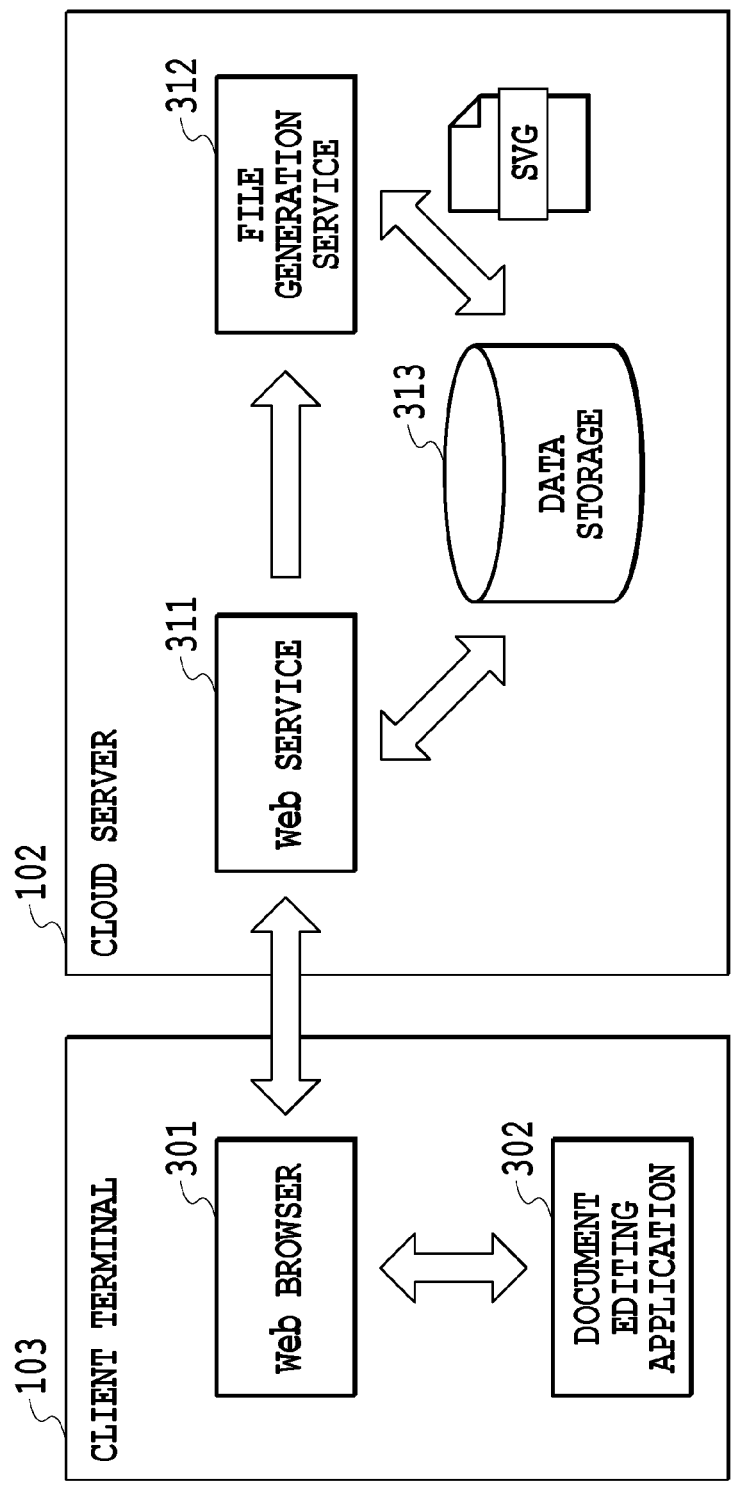
FIG. 3 is a diagram showing a configuration example of software that implements the cloud system.

FIG. 3 is a diagram showing a configuration example of software that implements the cloud system 100. The client apparatus 103 includes a Web browser 301 to browse a Web page and a document editing application 302 to create and edit source data of a business form and the like. A user accesses the cloud server 102 by using the Web browser 301. Then, the user gives instructions to generate an SVG document (uploads the source data created by the document editing application 302) and instructions to display the SVG document on the client apparatus 103 of the user (downloads the saved SVG document) to the cloud server 102.

The cloud server 102 communicates with the Web browser 301 by a Web service 311 and processes a request from the client apparatus 103, i.e., instructions of a user to generate and display an SVG document. For example, in the case where a request to generate an SVG document is made, the cloud server 102 delivers source data corresponding to the request to a file generation service 312 along with a job to give instructions to generate a file in the SVG format (hereinafter, simply called "job"). The file generation service 312 generates an SVG document based on the received source data and job. The generated SVG document is stored in a data storage 313 along with the job. Further, in the case where the request from the client apparatus 103 is to produce a display (acquire) an SVG document, the specified SVG document is read from the data storage 313 via the Web service 312 and sent to the client apparatus 103. The client apparatus 103 displays each page on its screen based on the SVG document received via the Web browser 301. It is possible for a user to edit a page displayed on the client apparatus 103 of the user, give instructions again to generate a new SVG document with the edited contents via the Web browser 301, and save the SVG document again.

<File Generation Service>

Figure 4:
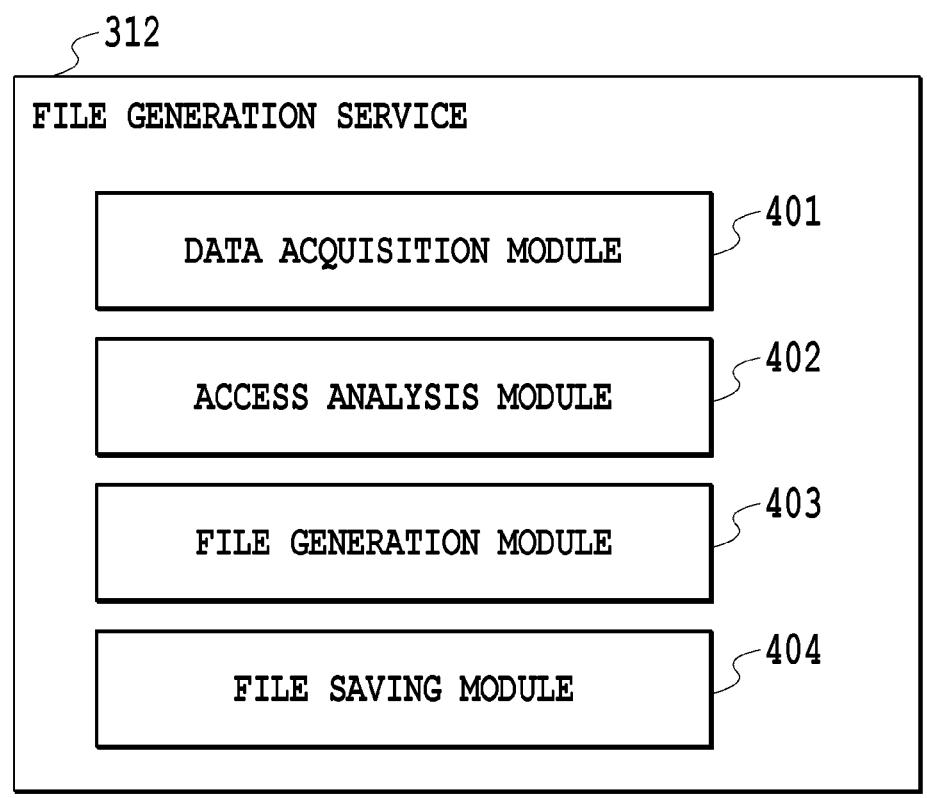
FIG. 4 is a diagram showing an internal configuration of a file generation service.

Next, the file generation service 312, which is the feature of the present embodiment, is explained in detail. The number of file generation services 312 that are activated changes in accordance with the number of requests from the client apparatus 103. That is, the larger the number of requests, the more file generation services 312 are activated in order to process the requests. FIG. 4 is a diagram showing an internal configuration of the file generation service 312. The file generation service 312 includes a data acquisition module 401, an access analysis module 402, a file generation module 403, and a file saving module 404.

The data acquisition module 401 is a module that acquires source data transmitted from the client apparatus 103 via the Web service 311. Here, the source data includes, for example, form data of a business form and information on a name, an address, and so on, which a user inputs to the form data of the business form on the client apparatus 103. The format of the source data may be one depending on the document editing application 302 (e.g., Word or the like). A configuration may also be accepted in which source data is converted into predetermined intermediate data (e.g., PDF) in the data acquisition module 401 in the case where the format of the source data is different from the format that can be processed by the file generation module 403. The access analysis module 402 is a module that analyzes the situation of access to the data storage 313 and determines conditions of a resource in the case where an SVG document is generated by the in-line method. The file generation module 403 is a module that acquires a resource from the source data and performs processing to generate an SVG document (file generation processing) by applying the in-line method or the external reference method. Details of the file generation processing will be described later. The file saving module 404 is a module that performs processing to save a generated SVG document in the data storage 313.

<External Reference Method and In-Line Method>

Figure 5A:
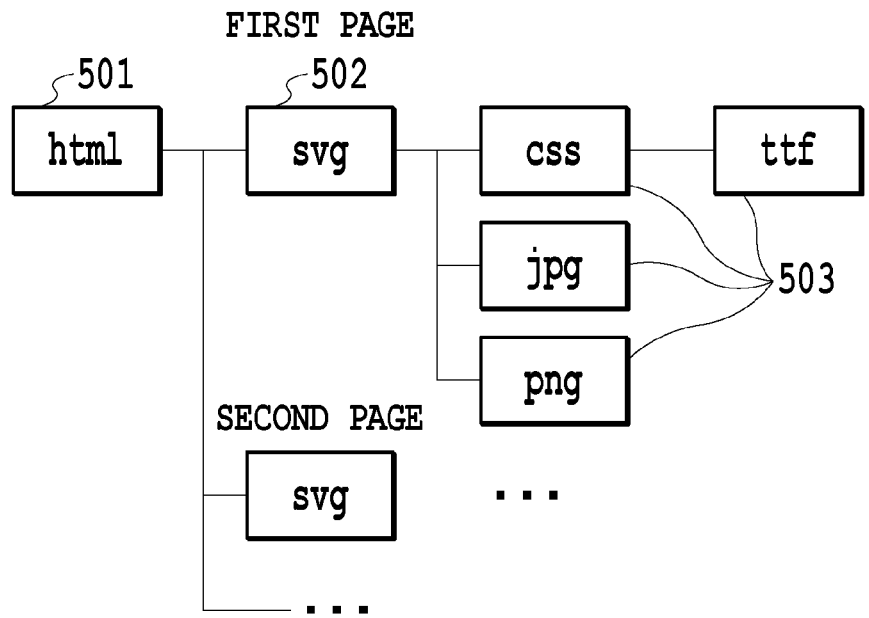
FIG. 5A and FIG. 5B are each a diagram showing an example of a file configuration of an SVG document.
Figure 5B:
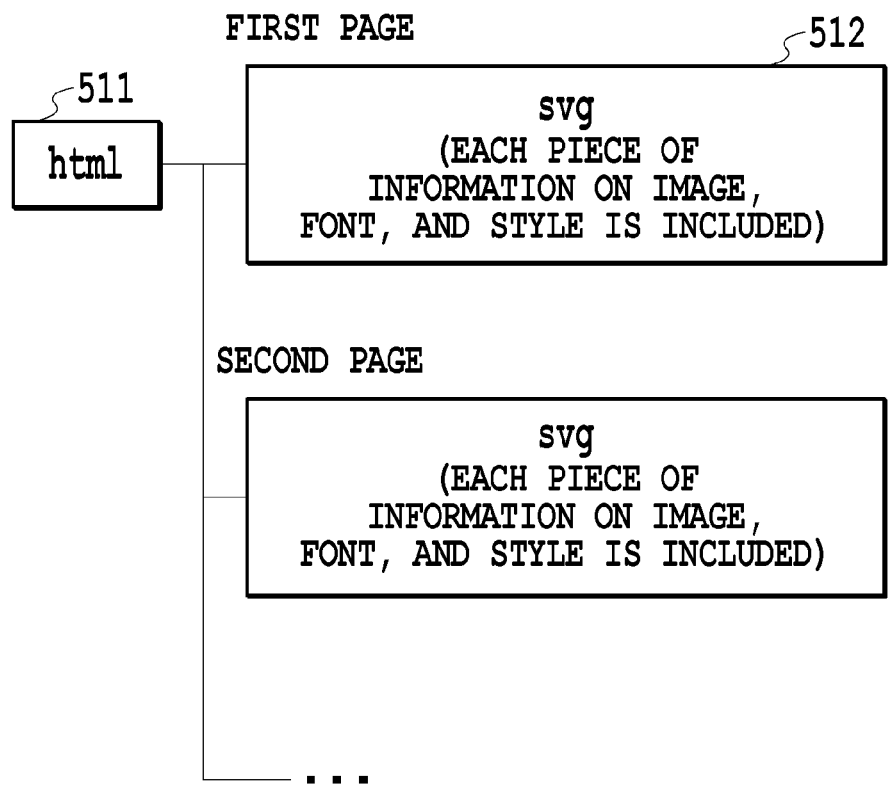

Here, the file configuration of an SVG document is reviewed. FIG. 5A and FIG. 5B are each a diagram showing an example of the file configuration of an SVG document, and FIG. 5A shows the case of the external reference method and FIG. 5B shows the case of the in-line method. In FIG. 5A and FIG. 5B, a rectangle represents one file and each rectangle represents some kind of information. The line connecting rectangles represents that there is a relationship of reference between the files.

First, points common to the in-line method and the external reference method are explained. As is obvious from FIG. 5A and FIG. 5B, in each method, the root of a tree structure is an HTML file 501 or 511. The HTML file is a file necessary to display an SVG document on the Web browser 301 of the client apparatus 103. Then, a file located at the downstream of the HTML file 501 or 511 is an SVG file 502 or 512. Here, the SVG file is a file whose extension is ".svg" and one file exists for one page.

Following the above, the file configuration of the external reference method is explained. In the external reference method, a resource that is used for drawing exists as another file (external file) 503 in addition to (outside) the SVG file 502. Then, the file configuration is such that the external file 503 is referred to by the SVG file 502. In FIG. 5A, "css" representing style information, "jpg" and "png" representing image information, and "ttf" representing font information exist separately as external files and are referred to by the SVG file 502. As the feature of the external reference method, mention is made of that the data size per file is small and that it is possible to produce a display in units of objects. As a result of this, at the time of displaying a page on the client apparatus 103, objects are displayed stepwise from the object that has already been read, and therefore, stress felt by a user is small compared to the case of the in-line method. On the other hand, the total number of files becomes large, and therefore, the load of access, such as write or read of a file to or from the data storage 313, becomes heavy.

Next, the file configuration of the in-line method is explained. The in-line method has such a configuration in which a resource that is used for drawing is included in the SVG file. In FIG. 5B, the style information, the image information, and the font information that are externally referred to in FIG. 5A are described within the SVG file 512. As the feature of the in-line method, mention is made of that the data size per file is large and that it is necessary to read all the resources to display one page. Because of this, it takes more time to display one page than the external reference method. On the other hand, in the case where a comparison is made for the data of the same contents, the number of files is smaller than that of the external reference method, and therefore, the load of access to the data storage 313 is lighter than that of the external reference method.

As described above, the external reference method and the in-line method have advantages and disadvantages, respectively, and both are in the relationship of trade-off. An object of the present invention is to perform file generation processing by an optimum configuration in order to make use of the advantages of both the methods as much as possible.

Following the above, how an SVG document generated by the file generation module 403 is stored and managed in the data storage 313 is explained. FIG. 6 is a diagram showing an example of a data structure in the case where the data storage 313 stores an SVG document. As shown in FIG. 6, the generated SVG document is managed with respect to four items: "Job ID" 601, "File name" 602, "URL" 603, and "Already-accessed flag" 604.

"Job ID" 601 is an identifier to uniquely identify file generation processing in the file generation module 403. Among a plurality of records saved in the data storage 313, the files whose "Job ID" 601 is the same are files generated by the same file generation processing.

"File name" 602 represents the name of an SVG document generated by file generation processing. Within the records whose "Job ID" 601 is the same, files whose "File name" 602 is the same do not exist, but within the records whose "Job ID" 601 is different, there is a case where another file whose "File name" 602 is the same exists.

"URL" 603 is a path representing the position at which each file is stored. "URL" 603 is unique for each file. By "URL" 603, a hierarchical relationship between files is represented. By accessing this URL, it is possible for the Web browser 301 to display an SVG document.

"Already-accessed flag" 604 is a flag representing whether or not each file has already been accessed by the Web browser 301 of the client apparatus 103. In the present embodiment, in the case where "TRUE" is set, this represents that the file has already been accessed and in the case where "FALSE" is set, this represents that the file has not been accessed yet. In the example in FIG. 6, the files belonging to the job whose "Job ID" 601 is "1" have already been accessed and the files belonging to the job whose "Job ID" 601 is "2" have not been accessed yet. Here, the fact that "TRUE" is set to "Already-accessed flag" 604 means that the generated and saved SVG document has been displayed on the client apparatus 103. In the use case where the page contents of the SVG document displayed on the client apparatus 103 are edited by a user and each time the editing is performed, a new SVG document is generated and saved, the same file is not accessed again. Consequently, in the use case such as this, on a condition that "FALSE" is set to "Already-accessed flag" 604, it is known that the file is a constituent file of the SVG document having a strong possibility of being accessed for editing in the future. Consequently, "Already-accessed flag" 604 may serve as an index to estimate how often the data storage 313 may be accessed during the same period of time (whether a predetermined number or more of simultaneous accesses is expected).

Figure 7:
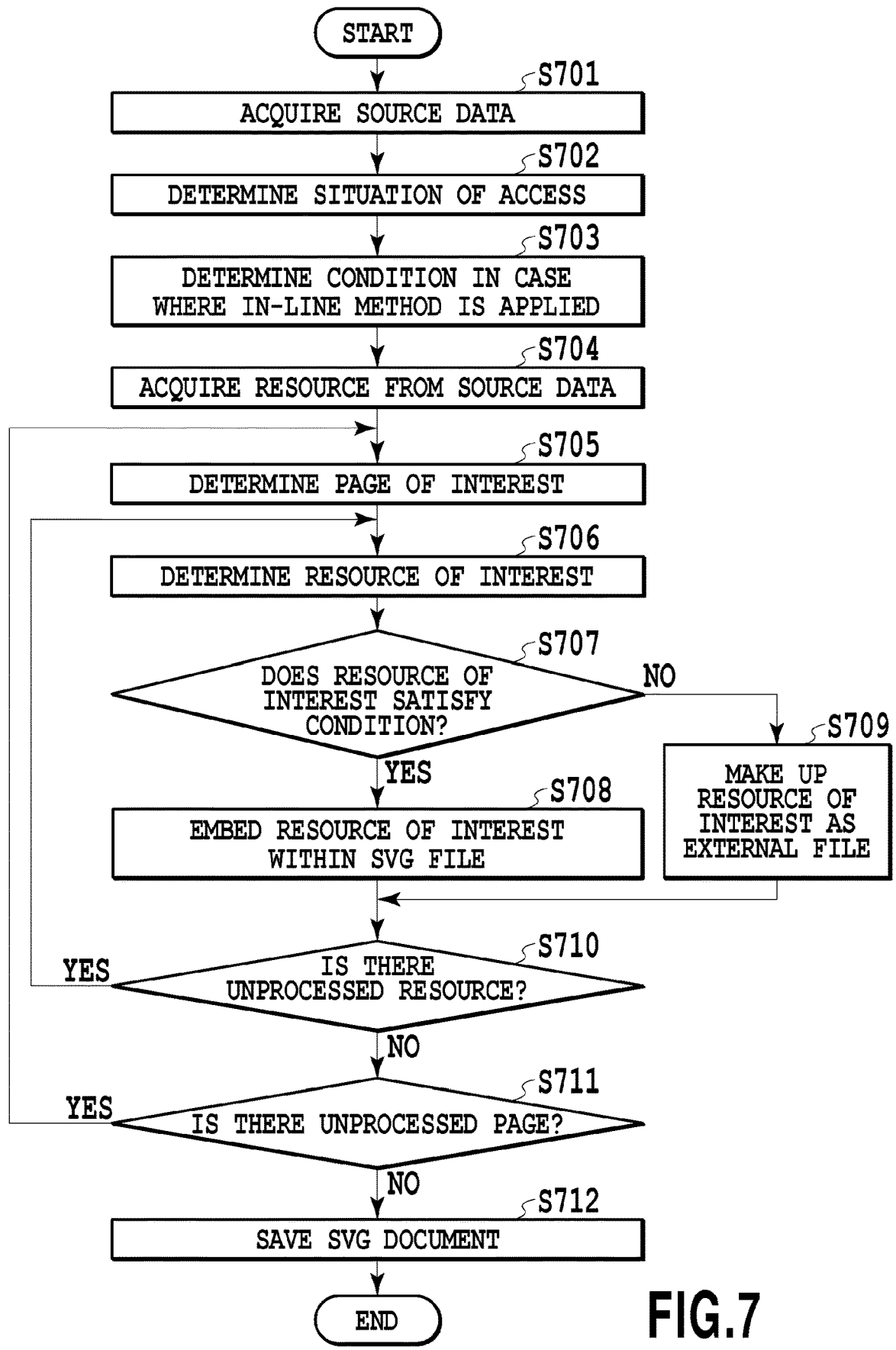
FIG. 7 is a flowchart showing a flow of file generation processing according to a first embodiment.

Next, the file generation processing to generate an SVG document from source data and to save the SVG document in the file generation service 312 is explained. FIG. 7 is a flowchart showing a flow of the file generation processing according to the present embodiment.

At step 701, the data acquisition module 401 acquires source data that is sent from the client terminal 103.

At step 702, the access analysis module 402 analyzes the situation of access to the data storage 313. Specifically, the access analysis module 402 refers to "Already-accessed flag" 604 and "Job ID" 601 described previously, acquires the number of jobs having a file to which "FALSE" is set, compares the acquired number of jobs with a threshold value determined in advance, and classifies the situation of access into levels (e.g., into three levels). As described above, the file to which "FALSE" is set has not been displayed yet on the client apparatus 103, and therefore, the possibility that the file is accessed to produce a display in the further is strong. Consequently, the case where the number of jobs having a file to which "FALSE" is set is large means that the possibility that a large number of files is accessed at the same timing is high. Here, it is assumed that the situation of access is classified into three levels, for example, "High", "Medium", and "Low". At this time, it is sufficient to prepare, for example, two threshold values so that the case where the number of jobs is fifty or more is classified to "High", the case where the number of jobs is smaller than twenty-five is classified to "Low", and the case where the number of jobs is between twenty-five and forty-nine is classified to "Medium". In the case where the situation of access is classified into two levels, i.e., "High" and "Low", only one threshold value is necessary. Of course, it may also be possible to increase the number of classification levels. Further, it may also be possible to determine the situation of access simply based on the number of files to which "FALSE" is set, in place of the number of jobs. In this case, it is sufficient to set threshold values to values between about ten times to hundred times the number of jobs, although the threshold values depend on the source data that is input.

At step 703, the access analysis module 402 determines the condition of a resource in the case where the in-line method is applied based the results of the analysis of the situation of access. Here, the case is explained where the data size is taken to be the condition. In this case, a threshold value of the data size in accordance with the results of the analysis of the situation of access is determined. For example, in the case where the situation of access is "High", 600 KB is determined, in the case where the situation of access is "Medium", 250 KB is determined, and in the case where the situation of access is "Low", 30 KB is determined. The larger the threshold value of the data size becomes, the more the number of resources that take the file configuration of the in-line method increases, and as a result of this, the total number of files of the SVG document decreases.

At step 704, the file generation module 403 analyzes header information and the like included in the source data and acquires all the resources within the source data.

At step 705, the file generation module 403 determines a page on which attention is focused (hereinafter, page of interest). Normally, the first page is determined to be a page of interest.

At step 706, the file generation module 403 determines a resource on which attention is focused (hereinafter, resource of interest) among the resources of the page of interest.

At step 707, the file generation module 403 determines whether or not the resource of interest satisfies the condition determined at step 703. Here, the data size of the resource of interest and the threshold value determined in accordance with the situation of access are compared. In the case where the results of the determination indicate that the data size of the resource of interest is smaller than or equal to the threshold value, the processing advances to step 708. On the other hand, in the case where the data size of the resource of interest exceeds the threshold value, the processing advances to step 709.

At step 708, the file generation module 403 generates a file of the resource of interest by applying the in-line method. That is, the resource of interest is embedded within the SVG file.

At step 709, the file generation module 403 generates a file of the resource of interest by applying the external reference method. That is, the resource of interest is made up as another external file different from the SVG file.

At step 710, whether or not the processing has been completed for all the resources of the page of interest is determined. In the case where there is an unprocessed resource, the processing returns to step 706 and the next resource of interest is determined and the processing is continued. On the other hand, in the case where the processing has been completed for all the resources of the page of interest, the processing advances to step 711.

At step 711, whether or not the processing has been completed for all the pages of the source data is determined. In the case where there is an unprocessed page, the processing returns to step 705 and the next page of interest is determined and the processing is continued. On the other hand, in the case where the processing has been completed for all the pages of the source data, the processing advances to step 712.

Figure 8A:
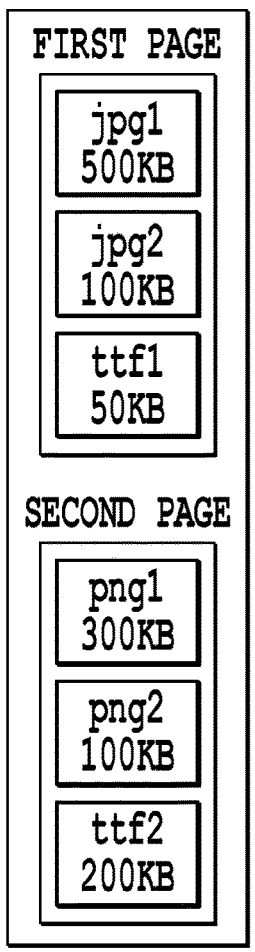
FIG. 8A to FIG. 8D are diagrams explaining file configurations of three kinds of SVG document generated from the same source data according to the first embodiment.
Figure 8B:
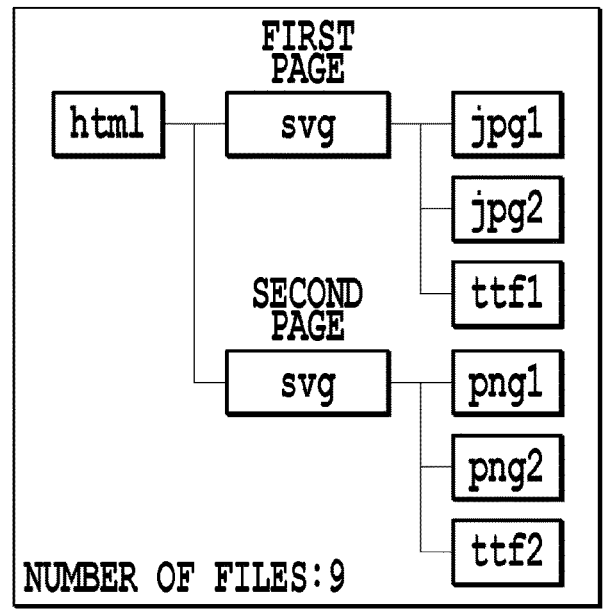
Figure 8C:
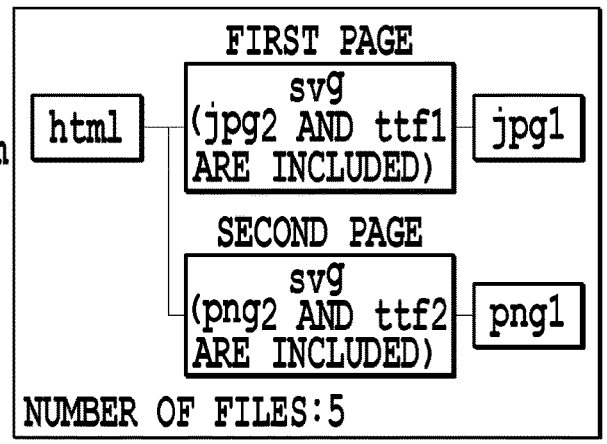
Figure 8D:
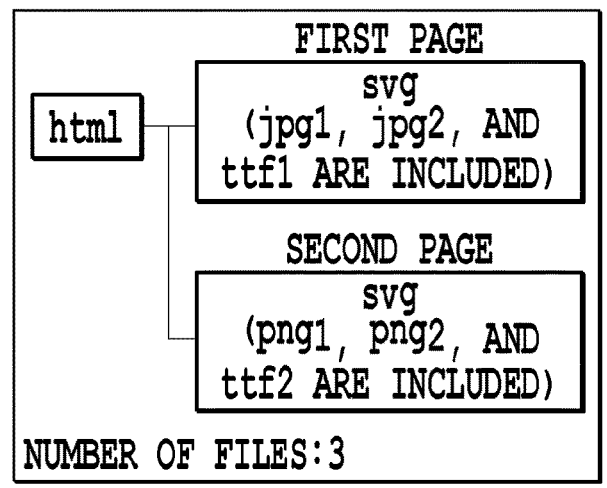

At step 712, the file saving module 404 stores the finished SVG document in the data storage 313. FIG. 8A to FIG. 8D are diagrams explaining file configurations of three kinds of SVG document generated from the same source data according to the present embodiment. FIG. 8A is a diagram showing a configuration of source data before the SVG document is generated. The source data in FIG. 8A includes two pages and in the first page, three resources in total, i.e., image information of 500 KB (jpg1), image information of 100 KB (jpg2), and font information of 50 KB (ttf1) are included. In the second page, three resources, i.e., image information of 300 KB (png1), image information of 100 KB (png2), and font information of 200 KB (ttf2) are included. From the source data such as this, three kinds of SVG document shown in FIG. 8B to FIG. 8D are generated in accordance with the results of the analysis of the situation of access. FIG. 8B is an SVG document that is generated in the case where the situation of access is "Low" and the data size threshold value is "30 KB, and the file of the resource of 30 KB or less is generated by the in-line method. In the source data in FIG. 8A, data of 30 KB or less does not exist, and therefore, the files of all the resources are generated by the external reference method. FIG. 8C is an SVG document that is generated in the case where the situation of access is "Medium" and the data size threshold value is "250 KB" and the file of the resource of 250 KB or less is generated by the in-line method. In this case, the files of only the image information jpg1 of the first page and the image information png1 of the second page are generated by the external reference method and the files of the other resources are generated by the in-line method. FIG. 8D is an SVG document that is generated in the case where the situation of access is "High" and the data size threshold value is "600 KB" and the file of the resource of 600 KB or less is generated by the in-line method. Here, all the resources of the source data have a size of 600 KB or less, and therefore, the files of all the resources are generated by the in-line method. Here, by a comparison, it is known that the numbers of files in FIG. 8B to FIG. 8D are nine, five, and three, respectively. That is, in the situation in which the number of accesses to the data storage 313 is small, the number of files may be large, and therefore, the external reference method is more likely to be applied. On the other hand, in the situation in which the number of accesses is large, the in-line method is more likely to be applied so that the number of files is decreased and the number of files to be accessed does not increase.

The above is the contents of the file generation processing in the present embodiment.

<Modification Example>

In the above-described example, in the case where a plurality of resources whose contents are the same exists, each resource is individually handled independently of one another, and as a result of this, it is possible to make up the resources as separate external files. Consequently, an aspect is explained as a modification example in which a more efficient file configuration is implemented by sharing resources in the case where a plurality of resources whose contents are the same exists.

In the present modification example, in the stage where all the resources within the source data are acquired at step 704 described above, whether or not there are resources whose contents are the same is determined and in the case where there are resources whose contents are the same, the resources are rearranged and integrated into one resource as a shared resource. The processing at step 705 and subsequent steps are the same as that described above, and therefore, explanation is omitted.

Figure 9A:
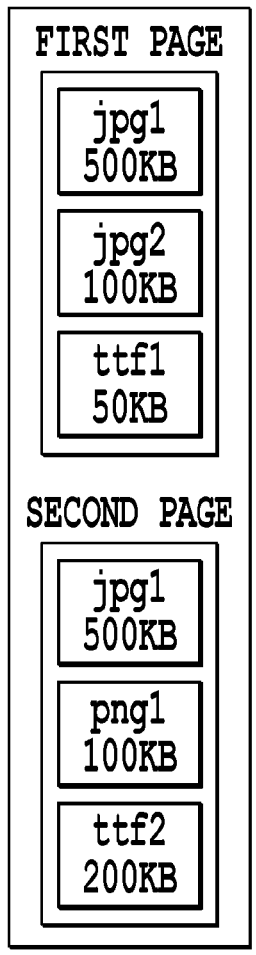
FIG. 9A to FIG. 9C are diagrams explaining file configurations of an SVG document generated by a modification example of the first embodiment.
Figure 9B:
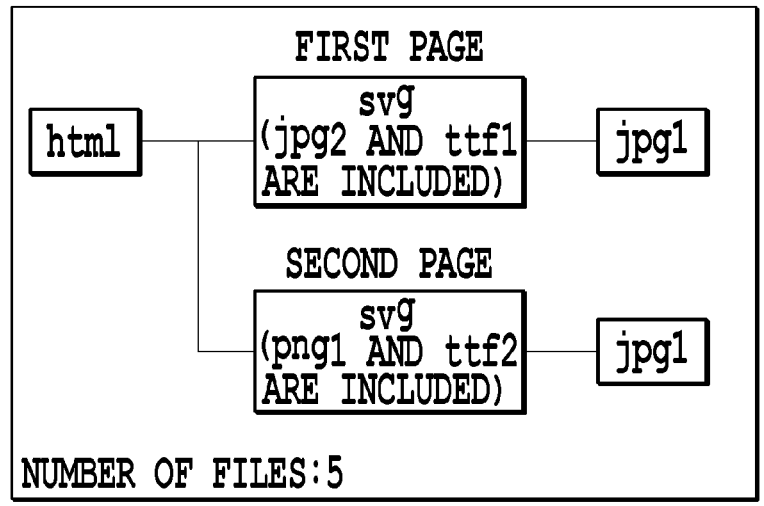
Figure 9C:
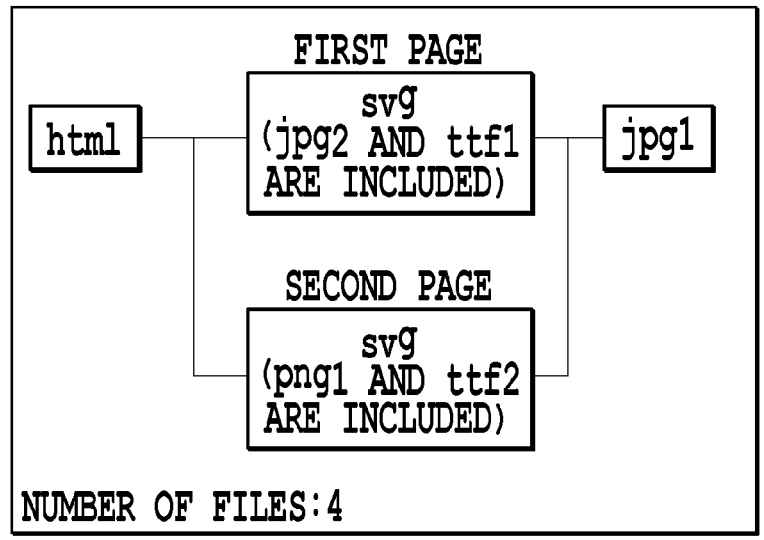

FIG. 9A to FIG. 9C are diagrams explaining file configurations of an SVG document generated by the present modification example. FIG. 9A is a diagram showing a configuration of source data before the SVG document is generated. The source data in FIG. 9A includes two pages and in the first page, three resources in total, i.e., image information of 500 KB (jpg1), image information of 100 KB (jpg2), and font information of 50 KB (ttf1) are included. In the second page, three resources, i.e., image information of 500 KB (jpg1) the same as that of the first page, image information of 100 KB (png1), and font information of 200 KB (ttf2) are included. As described above, the image information jpg1 of the first page and the image information jpg1 of the second page are the resources whose contents are the same. Examples of the SVG document that is generated from this source data are shown in FIG. 9B and FIG. 9C. It is assumed that each threshold value of the data size of the resource to which the in-line method is applied is 250 KB.

Then, FIG. 9B shows the file configuration of the SVG document that is generated by the embodiment described above and FIG. 9C shows the file configuration of the SVG document that is generated by the present modification example. It is known that jpg1 that is referred to by the SVG file of a page and jpg1 referred to by the SVG file of the other page are separate external files in FIG. 9B, but one external file jpg1 is shared and referred to in FIG. 9C. As a result of this, in the SVG document in FIG. 9C, the number of files is four and the number of files is reduced. Here, as a matter of convenience for explanation, the simplest example is explained, and therefore, the effect of the reduction in the number of files is not so significant, but in the case where there are three or more resources whose contents are the same, or in the case where a plurality of kinds of page or a plurality of pages exists, the effect is significant. Further, the case is explained here where the shared resource is made up as another file by the external reference method, but even in the case of the in-line method, it is possible to share a resource as long as the resource is within the same page. In this case, the number of files does not change, and therefore, this does not contribute to suppression of the number of files, but the file size becomes small, and therefore, the processing load of the system is reduced.

In the present embodiment, as the reference at the time of determining the situation of access, the history of access, such as the number of jobs not displayed yet (or the number of files), is used, but this is not limited. For example, it may also be possible to use the number of file generation services 312 activated on the cloud server 102 as an index. Alternatively, it may also be possible to use the number of accesses to the data storage 313 per unit time as an index. That is, any index may be used as long as the index can determine how many times the data storage 313 may be accessed during the same period of time.

Further, as the condition in the case where the in-line method is applied, the data size of the resource is used, but it may also be possible to use, for example the number of resources as a condition and to enable description within the SVG file in the case where the number of resources is smaller than or equal to a predetermined number. By this method also, it is possible to suppress the number of files of the SVG document.

As described above, according to the present embodiment, the condition of the resource at the time of applying the in-line method is determined in accordance with the situation of access to the data storage. Due to this, it is possible to dynamically change the configuration of the document file that is generated on the cloud system, and therefore, it is made possible to keep the optimum balance between the suppression of the number of files and the maintenance of display performance, which are in the relationship of trade-off.

Second Embodiment

In the first embodiment, the file configuration as in FIG. 8B is generated in the case where a large number of simultaneous accesses to the document files is not expected, and therefore, the possibility that the access limit to the data storage 313 is imposed is faint. However, depending on the number of pages and the number of resources of the source data, there is a possibility that the SVG document is made up of a number of files larger than supposed one. Consequently, an aspect is explained as a second embodiment in which the file of only the top page is received by the external reference method in the case where a large number of simultaneous accesses to the saved document files is not expected. Explanation of the portions in common to those of the first embodiment is omitted or simplified and in the present embodiment, different points are explained mainly.

Figure 10:
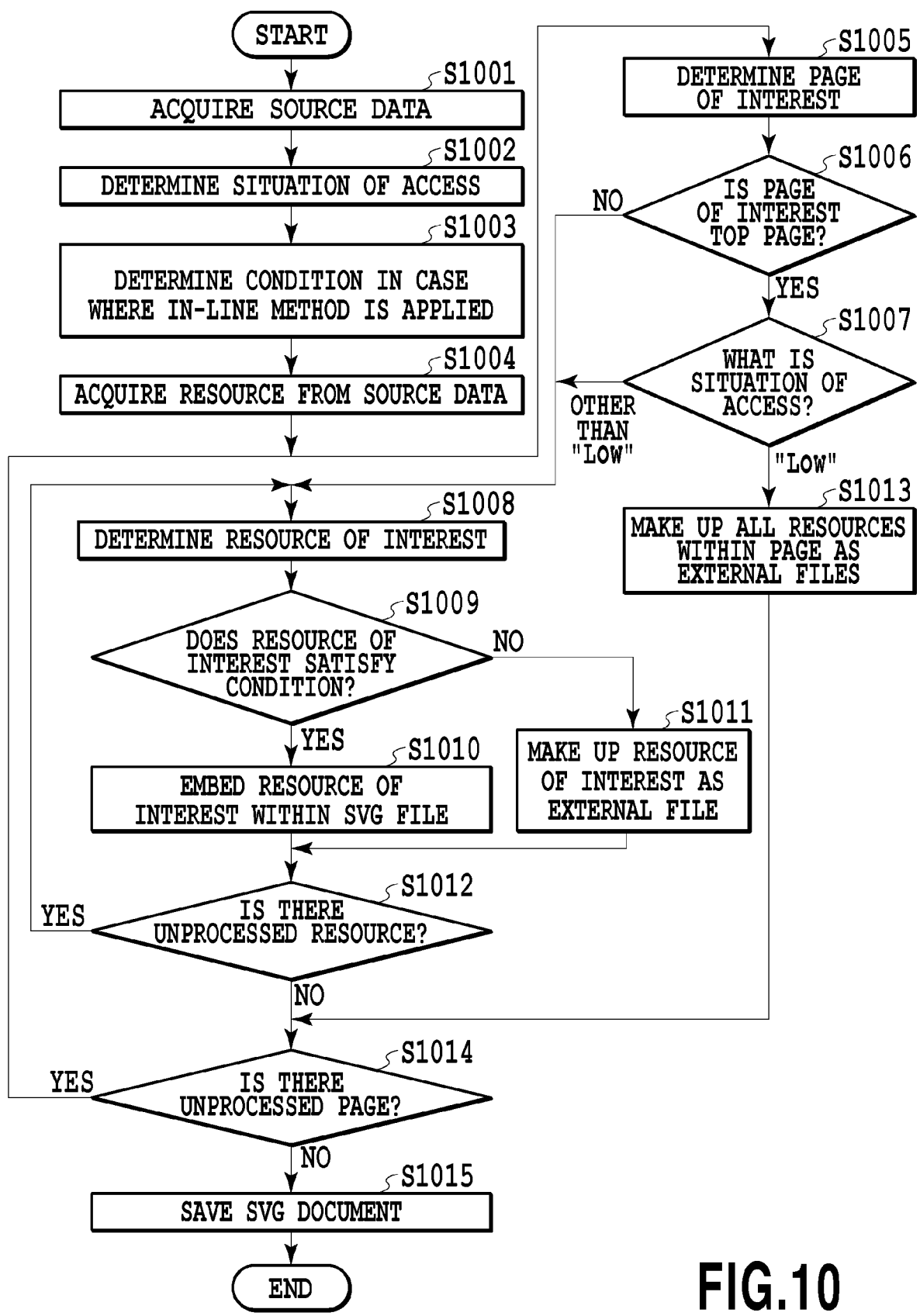
FIG. 10 is a flowchart showing a flow of file generation processing according to a second embodiment.

FIG. 10 is a flowchart showing a flow of file generation processing according to the present embodiment. Step 1001 to step 1005 are the same as steps 701 to 705 of the flow in FIG. 7 according to the first embodiment. At step 1005, a page of interest is determined and at step 1006, the file generation module 403 determines whether the page of interest is the top page. In the case where the page of interest is the top page, the processing advances to step 1007. On the other hand, in the case where the page of interest is a page other than the top page, the processing advances to step 1008. At step 1007, the processing is branched according to whether the situation as the results of the determination at step 1002 is a situation in which a large number of simultaneous accesses is not expected (here, whether the situation of access is "Low"). In the case where the situation of access is "Low", the processing advances to step 1013 and in the other cases, the processing advances to step 1008.

Step 1008 to step 1012 correspond to step 706 to step 710, respectively, of the flow in FIG. 7. That is, for the page of interest, whether the condition determined at step 1003 is satisfied is determined for each resource of interest and the file generation processing of the resource of interest by the in-line method or the external reference method is performed in accordance with the determination results.

At step 1013, the file generation module 403 performs the file generation processing by the external reference method for all the resources within the top page. On the completion of the file generation processing for the top page, the processing advances to step 1014.

Step 1014 and step 1015 correspond to step 711 and step 712 of the flow in FIG. 7. That is, until the processing is completed for all the pages of the source data, the processing at step 1005 and subsequent steps is repeated and the finished SVG document is stored in the data storage 13.

Figure 11A:
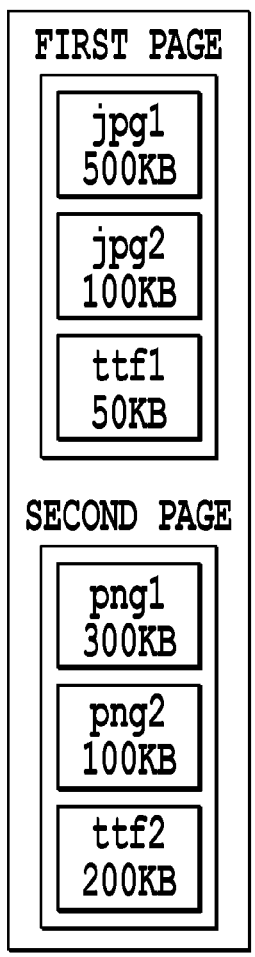
FIG. 11A to FIG. 11C are diagrams explaining file configurations of an SVG document generated by the second embodiment.
Figure 11B:
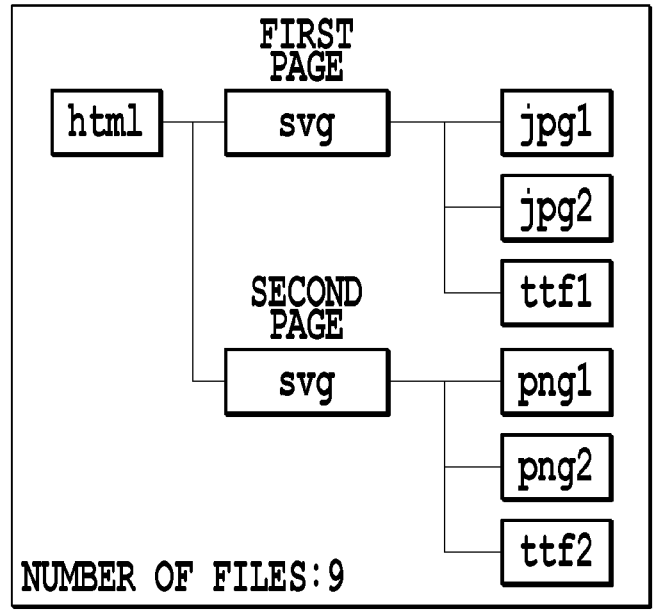
Figure 11C:
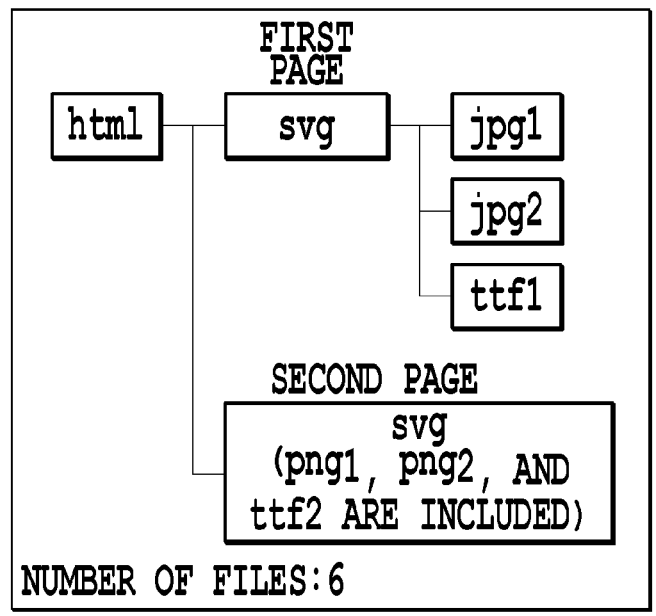

FIG. 11A to FIG. 11C are diagrams explaining file configurations of an SVG document generated by the present embodiment. FIG. 11A is a diagram showing a configuration of source data before the SVG document is generated. The source data in FIG. 11A includes two pages and in the first page, three resources in total, i.e., image information of 500 KB (jpg1), image information of 100 KB (jpg2), and font information of 50 KB (ttf1) are included. In the second page, three resources, i.e., image information of 300 KB (png1), image information of 100 KB (png2), and font information of 200 KB (ttf2) are included. Examples of the SVG document generated from the source data are shown in FIG. 11B and FIG. 11C. It is assumed that each threshold value of the data size of the resource to which the in-line method is applied is 30 KB.

Then, FIG. 11B is the file configuration of the SVG document generated by the first embodiment and FIG. 11C shows the file configuration of the SVG document generated by the present embodiment. In FIG. 11B, for both the first page and the second page, the files of all the resources are generated by the external reference method. In contrast to this, in FIG. 11C, only for the top page, the files of the resources are generated by the external reference method and for the second page, the resources are described within the SVG file by the in-line method. By a comparison, it is known that the numbers of files in FIG. 11B and FIG. 11C are nine and six, respectively, and that it is possible to reduce the number of files more in the case where the present embodiment is applied. Then, the effect becomes more significant as the number of resources within the top page increases.

According to the present embodiment, in the case where it is determined that the situation of access is not "High", the files of only the top page are generated by the external reference method and the files of the pages other than the top page are generated by the in-line method. By performing such control, the top page has a file configuration with favorable display performance, and therefore, it is possible to quickly produce a display. By doing so, it is possible to read the drawing data of the second and subsequent pages while a user is browsing the top page, and therefore, the stress felt by the user is reduced. Further, the total number of files decreases, and therefore, it is possible to further reduce the load of file access.

Third Embodiment

Next, an aspect is explained as a third embodiment in which a sprite image is created for the image resource included in each page of the source data. Here, the sprite image is an integrated image obtained by linking a plurality of images into one image. The method of displaying each individual image by specifying a display range by CSS for the sprite image is "SCC sprite" and the present embodiment makes use of this. Explanation of the portions in common to those of the first embodiment is omitted or simplified and in the present embodiment, different points are explained mainly.

Figure 12:
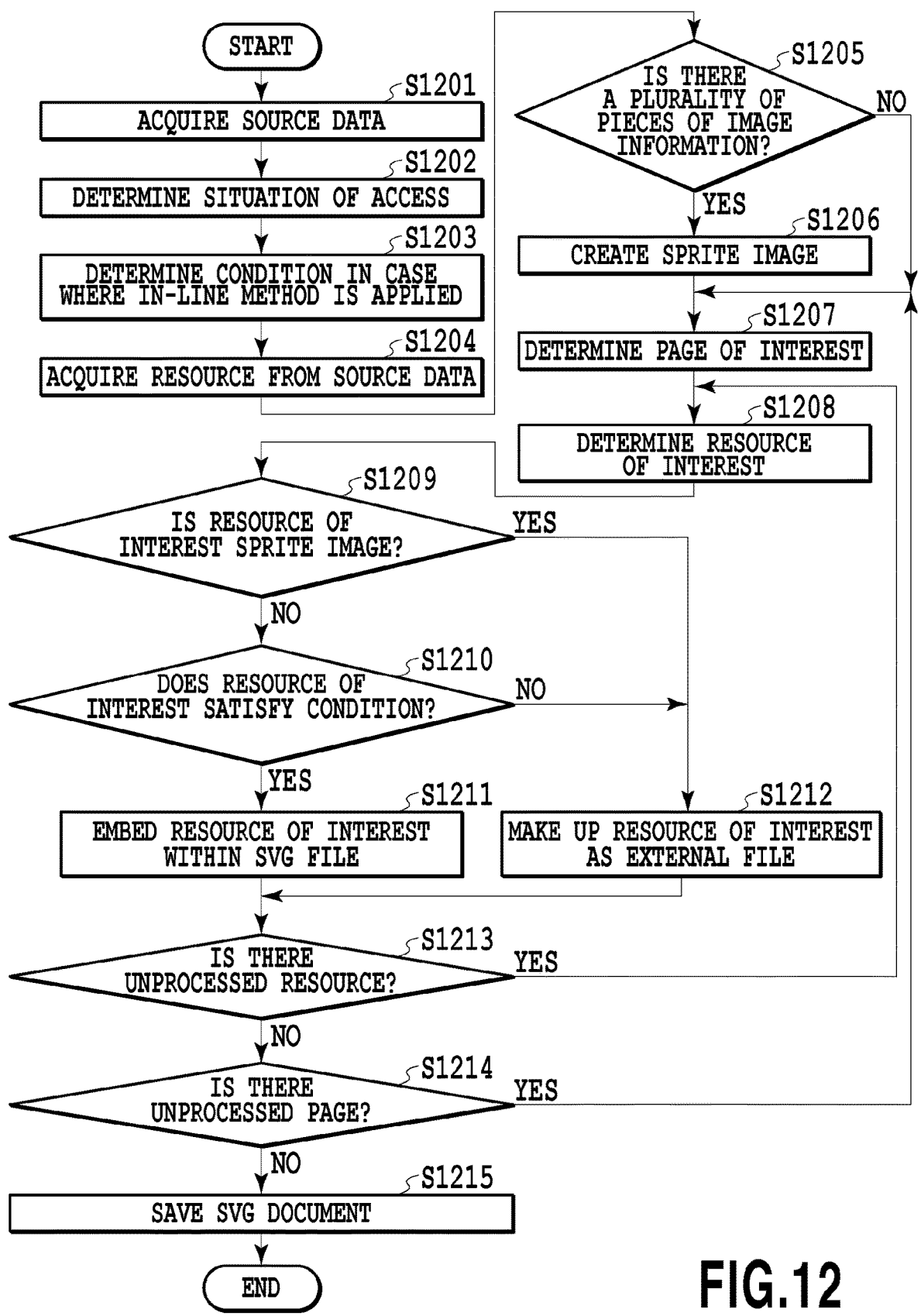
FIG. 12 is a flowchart showing a flow of file generation processing according to a third embodiment.

FIG. 12 is a flowchart showing a flow of file generation processing according to the present embodiment. Step 1201 to step 1204 are the same as steps 701 to 704 of the flow in FIG. 7 according to the first embodiment. At step 1204, all the resources are acquired from the source data and at step 1205, the file generation module 403 determines whether a plurality of pieces of image information of the same kind exists within the acquired resources. In this case, the same kind means that the image format is the same and for example, jpg and png are different image formats, and therefore, they are not the same kind. In the case where a plurality of pieces of image information of the same kind exists, the processing advances to step 1206. On the other hand, in the case where a plurality of pieces of image information of the same kind does not exist, the processing advances to step 1207.

At step 1206, the above-described sprite image is created for a plurality of pieces of image information of the resources acquired at step 1204. The data of the created sprite image is handled as one resource in the subsequent steps.

Step S1207 and step 1208 correspond to steps 705 and 706 of the flow in FIG. 7 and the page of interest and the resource of interest are determined, respectively. Then, at step 1209, the processing is branched according to whether the resource of interest is the above-described sprint image. In the case where the resource of interest is not the sprite image, the processing advances to step 1210 and in the case where the resource of interest is the sprite image, the processing advances to step 1212.

Step 1210 to step 1215 correspond to step 707 to step 710, respectively, of the flow in FIG. 7. That is, for the page of interest, where the condition determined at step 1203 is satisfied is determined for each resource of interest and in accordance with the determination results, the file generation processing of the resource of interest by the in-line method or the external reference method is performed. In this case, to the sprite image, the external reference method is applied and the sprite image is made up as an external file. Then, the processing is continued until the processing is completed for all the pages of the source data and the finished SVG document is stored in the data storage 313.

Figure 13A:
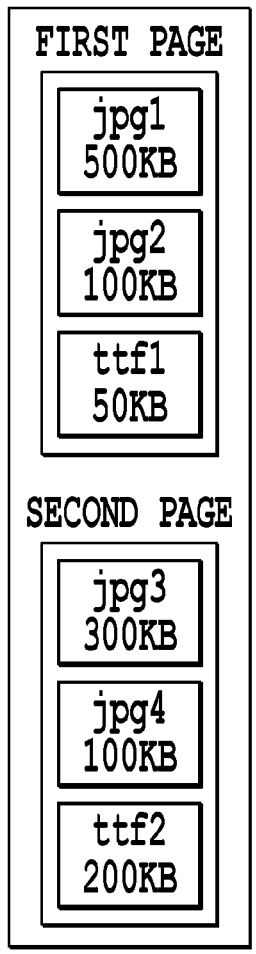
FIG. 13A to FIG. 13C are diagrams explaining file configurations of an SVG document generated by the third embodiment.
Figure 13B:
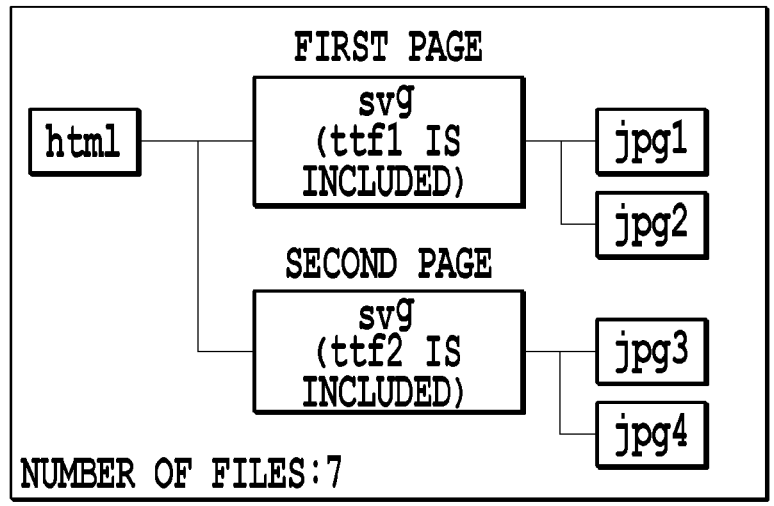
Figure 13C:
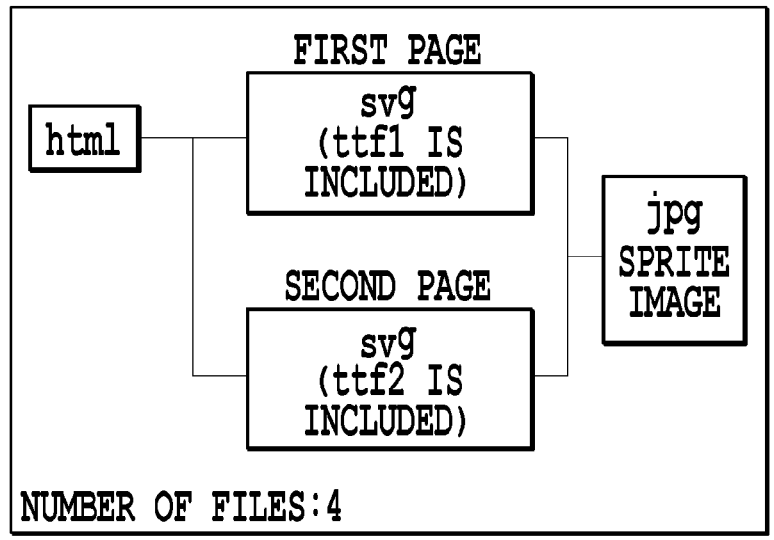

FIG. 13A to FIG. 13C are diagrams explaining file configurations of an SVG document generated by the present embodiment. FIG. 13A is a diagram showing a configuration of source data before the SVG document is generated. The source data in FIG. 13A includes two pages and in the first page, three resources in total, i.e., image information of 500 KB (jpg1), image information of 100 KB (jpg2), and font information of 50 KB (ttf1) are included. In the second page, three resources, i.e., image information of 300 KB (jpg3), image information of 100 KB (jpg4), and font information of 200 KB (ttf2) are included. That is, four pieces of image information of the same kind exist in the first page and the second page together. Then, FIG. 13B shows a file configuration of the SVG document generated from the source data by the first embodiment and FIG. 13C shows a file configuration of the SVG document generated by the present embodiment. In FIG. 13B, each piece of image information is made up as each individual external file but in FIG. 13C, one sprite image file obtained by combining the four pieces of image information is shared and referred to. Then, by a comparison, it is known that the numbers of files in FIG. 13B and FIG. 13C are seven and four, respectively, and that it is possible to significantly reduce the number of files.

According to the present embodiment, in the case where image resources of the same kind are included within source data, it is possible to integrate the image resources into one sprite image, and therefore, the larger the number of image resources of the same kind, the greater the effect of the reduction in the number of files. Consequently, depending on the configuration of source data, it is possible to significantly reduce the total number of files, and therefore, it is possible to further reduce the load of file access.

As above, the three embodiments are explained individually, but each embodiment is not independent of one another and it is also possible to combine the contents of each embodiment. For example, it is also possible to apply the in-line method only to the top page as well as to share a resource by combining the modification example of the first embodiment and the second embodiment.

Further, in each of the above-described embodiments, explanation is given by taking the case where the document file in the SVG format is generated as an example, but the example is not limited to this. It is possible to widely apply the embodiments to the generation of a document file in a format having a structure similar to the SVG, such as JDF (Job Definition Format) based on the XML, as in the case of the SVG.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where services of generation and saving of a document file are provided on a cloud system, the configuration of a document file to be generated is changed in accordance with the situation of access to a storage. Due to this, it is made possible to cause the suppression of the number of files and the maintenance of display performance to coexist.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-188119 filed Sep. 27, 2016, which is hereby incorporated by reference wherein in its entirety.

What is claimed is:

1. A server apparatus comprising:
a communication unit configured to receive source data from a client apparatus;
a file generation unit configured to generate one or more files that correspond to a document based on a plurality of resources included in the received source data; and
a saving unit configured to save the one or more generated files in a storage, wherein
the file generation unit performs:
determining which of an in-line method and an external reference method is to be applied to each of the plurality of resources included in the received source data in accordance with a situation of access to the storage;
generating a page file corresponding to each page of the document, wherein the page file contains one or more resources for which the in-line method is determined to be applied; and
generating one or more additional files corresponding to one or more resources for which the external reference method is determined to be applied, wherein the generated additional files are referred to by the generated page file.

2. The server apparatus according to claim 1, further comprising:
an analysis unit configured to determine the situation of access based on a predetermined index.

3. The server apparatus according to claim 2, wherein
the predetermined index is a history of access to files that correspond to a plurality of documents saved in the storage.

4. The server apparatus according to claim 3, wherein
the history of access is a number of jobs corresponding to a request to generate a file from the client apparatus for a document that has not been accessed yet by the client apparatus of a plurality of documents saved in the storage.

5. The server apparatus according to claim 3, wherein
the history of access is a number of files making up a document that has not been accessed yet by the client apparatus of a plurality of documents saved in the storage.

6. The server apparatus according to claim 3, wherein
the communication unit, the file generation unit, and the saving unit are implemented by software whose number of activated pieces of software changes in accordance with a number of requests from the client apparatus, and
the predetermined index is the number of pieces of software activated in the server apparatus.

7. The server apparatus according to claim 3, wherein
the predetermined index is a number of accesses to the storage per unit time.

8. The server apparatus according to claim 1, wherein
the file generation unit determines a condition at a time of applying the in-line method in accordance with the situation of access,
the file generation unit generates the page file containing the one or more resources that satisfy the condition, and
the file generation unit generates the one or more additional files corresponding to the one or more resources that do not satisfy the condition.

9. The server apparatus according to claim 8, wherein
the condition is that a data size of the resource is smaller than or equal to a threshold value.

10. The server apparatus according to claim 8, wherein the condition is that a number of resources is smaller than or equal to a threshold value.

11. The server apparatus according to claim 1, wherein the file generation unit generates, in a case where resources of the same contents exist in a plurality of pages of the source data, a file of the resource so that the resource is shared by the plurality of pages.

12. The server apparatus according to claim 1, wherein the file generation unit generates, in a case where a predetermined number or more of simultaneous accesses to saved document files is not expected, a file of only the top page by an external reference method.

13. The server apparatus according to claim 1, wherein the resource is image information, font information, and style information.

14. The server apparatus according to claim 13, wherein the file generation unit generates, in a case where a plurality of pieces of image information of the same kind exists in the source data, a file by combining the plurality of pieces of image information into one piece of image information.

15. The server apparatus according to claim 1, wherein the server apparatus is a virtual server in a cloud computing system.

16. The server apparatus according to claim 1, wherein the storage is a storage in a cloud computing system.

17. A method comprising:
receiving source data of a document from a client apparatus;
   determining which of an in-line method and an external reference method is to be applied to each of a plurality of resources included in the received source data in accordance with a situation of access to a storage;
   generating a page file corresponding to each page of the document, wherein the page file contains one or more resources for which the in-line method is determined to be applied;
   generating one or more additional files corresponding to one or more resources for which the external reference method is determined to be applied, wherein the generated additional files are referred to by the generated page file; and
   saving the generated page file and the generated one or more additional files in the storage.

18. A non-transitory computer-readable storage medium storing a program for causing a computer to perform:
receiving source data of a document from a client apparatus;
determining which of an in-line method and an external reference method is to be applied to each of a plurality of resources included in the received source data in accordance with a situation of access to a storage;
generating a page file corresponding to each page of the document, wherein the page file contains one or more resources for which the in-line method is determined to be applied;
generating one or more additional files corresponding to one or more resources for which the external reference method is determined to be applied, wherein the generated additional files are referred to by the generated page file; and
saving the generated page file and the generated one or more additional files in the storage.

* * * * *